United States Patent [19]
Nishiyama

[11] Patent Number: 5,905,396
[45] Date of Patent: May 18, 1999

[54] CLAMP PULSE CIRCUIT

[75] Inventor: Seiichi Nishiyama, Kanagawa, Japan

[73] Assignee: Sony Corporation, Japan

[21] Appl. No.: 08/867,463

[22] Filed: Jun. 2, 1997

Related U.S. Application Data

[62] Division of application No. 08/581,375, Dec. 29, 1995.

[30] Foreign Application Priority Data

Jan. 12, 1995 [JP] Japan ................................. P07-003028

[51] Int. Cl.[6] ....................................................... H03F 3/45
[52] U.S. Cl. ............................. 327/291; 327/563; 348/646
[58] Field of Search ..................................... 327/562, 563,
327/291, 172, 176; 348/645, 647, 651,
646; 330/252, 277

[56] References Cited

U.S. PATENT DOCUMENTS 4,327,373  4/1982  Gomi ......................................... 358/28
4,550,338  10/1985  Kojima ...................................... 358/20
4,630,116  12/1986  Isogawa et al. ........................ 358/160

*Primary Examiner*—Tuan T. Lam
*Attorney, Agent, or Firm*—Ronald P. Kananen; Rader, Fishman & Grauer

[57] ABSTRACT

A clamp pulse generating circuit comprising a synchronizing decision circuit for deciding whether an external synchronizing pulse is being input or not; an exclusive-OR circuit, a change-over switch and a pulse width detecting circuit for deciding whether a video signal containing a synchronizing pulse is being input or not; and a pulse generating circuit for generating a clamp pulse at the front or rear edge of the external synchronizing pulse output from a synchronizing separator circuit, and outputting the clamp pulse at the front edge selected by a selection switch when the external synchronizing pulse is being input and forcing to select and output the clamp pulse at the rear edge of the synchronizing pulse irrespective of the presence of the external synchronizing pulse when the video signal containing the synchronizing pulse is being input.

7 Claims, 7 Drawing Sheets

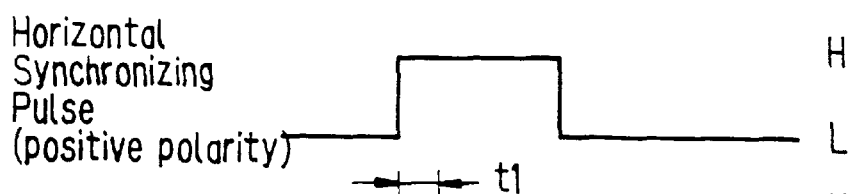
FIG.6A Horizontal Synchronizing Pulse (positive polarity)
FIG.6B Clamp Pulse
FIG.6C Clamp Pulse
FIG.7
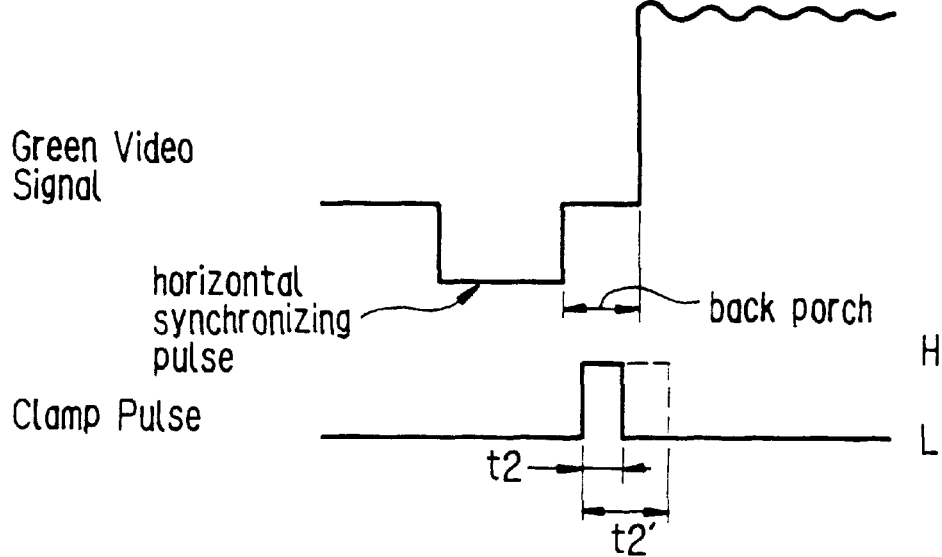

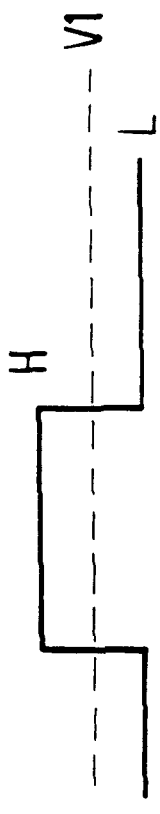
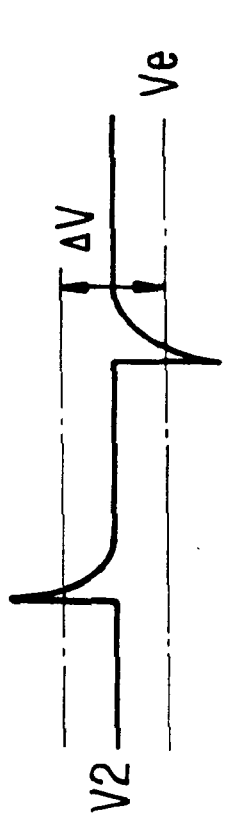
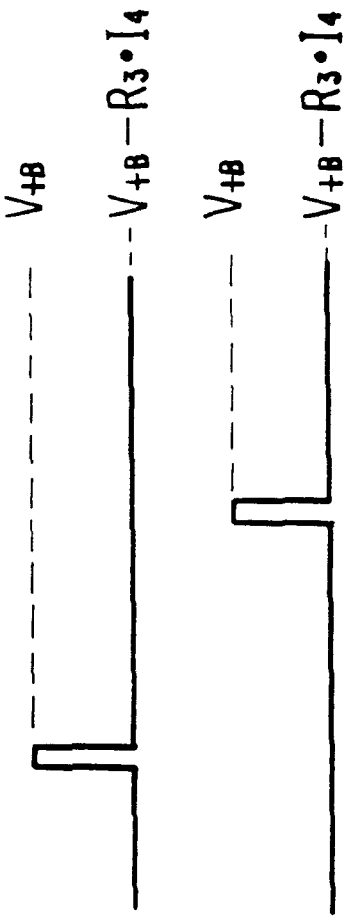
FIG. 9A Horizontal Synchronizing Pulse
FIG. 9B Differential Waveform
FIG. 9C Clamp Pulse
FIG. 9D Clamp Pulse

CLAMP PULSE CIRCUIT

This application is a division of application Ser. No. 08/581,375 filed Dec. 29, 1995.

BACKGROUND OF THE INVENTION

1. Field of the Invention

The present invention relates to a clamp pulse generating circuit and more particularly to a circuit for generating clamp pulses used for keeping a pedestal level of a brightness signal in a video signal at constant level.

2. Description of the Related Art

Because DC component is lost in a capacitive coupling amplifier circuit and colors of color images cannot be reproduced faithfully in a video signal processing circuit, pedestal clamp in which a pedestal level of a brightness signal is clamped by clamp pulses to keep it at constant level is carried out to reproduce the DC component lost by the capacitive coupling. A circuit for generating the clamp pulses used for the pedestal clamp has been adapted to generate the pulses in a timing slightly behind a horizontal synchronizing pulse at that in general.

In a pedestal clamp circuit using the clamp pulse generating circuit constructed as described above, the pedestal level has been clamped at a back porch 6 in a horizontal blanking period 2 of a video signal 1 shown in FIG. 1, because the clamp pulse is generated in the timing behind the horizontal synchronizing pulse. However, in the field of computer displays and the like, horizontal frequency tends to be increased with the increase of the resolution and because the gap of the back porch portion 6 becomes narrow as the horizontal frequency is increased, a pulse width of the clamp pulse has to be narrowed.

Then, a problem that a power consumption increases occurs when the pulse width of the clamp pulse is set narrower because an output impedance at an output stage has to be lowered so as not to blunt the waveform of the clamp pulse in the clamp pulse generating circuit. When the blunted waveform of the clamp pulse was input to the pedestal clamp circuit on the other hand, it posed a problem that a situation in which an accurate pedestal level cannot be held or in the worst case, the pedestal clamp cannot be performed may occur.

Accordingly, it is an object, of the present invention to provide a clamp pulse generating circuit which can generate a clamp pulse having a desired pulse width in generating the clamp pulse at an external synchronizing pulse.

SUMMARY OF THE INVENTION

A clamp pulse generating circuit of the present invention comprises a synchronizing input terminal for inputting an external synchronizing pulse; synchronizing decision means for deciding whether the external synchronizing pulse is being input; a video input terminal for inputting a video signal containing a synchronizing pulse; video decision means for deciding the presence of input of the video signal; pulse generating means for generating a clamp pulse at the front edge of the external synchronizing pulse when the result of decision of the synchronizing decision means indicates that the inputted external synchronizing pulse is present and for generating a clamp pulse at the rear edge of the synchronizing pulse when the result of decision of the video decision means indicates that the inputted video signal is present, irrespective of the result of decision of the synchronizing decision means; and a clamp pulse output terminal for outputting the clamp pulses generated by the pulse generating means to the outside.

In the clamp pulse generating circuit constructed as described above, the synchronizing decision means decides that the external synchronizing pulse has been input when it has been input to the synchronizing input terminal. Then, the pulse generating means generates a clamp pulse at the front edge of the external synchronizing pulse as it receives the decision result that the external synchronizing pulse has been input. Meanwhile, the video decision means decides that the video signal containing the synchronizing signal has been input when it has been input to the video input terminal. Then, the pulse generating means generates a clamp pulse at the rear edge of the synchronizing pulse within the video signal as it receives the decision result that the video signal has been input.

As a special case, there is a case when both the external synchronizing pulse and the video signal containing the synchronizing signal are input. In such a case also, the pulse generating means generates the clamp pulse at the rear edge of the synchronizing pulse irrespective of whether the external synchronizing pulse has been input or not as the video decision means decides that the video signal has been input.

The specific nature of the present invention, as well as other objects, uses and advantages thereof, will clearly appear from the following description and from the accompanying drawings.

BRIEF DESCRIPTION OF THE DRAWINGS

FIGS. 6A through 6C are waveform charts for explaining the operation of the embodiment shown in FIG. 2;

FIG. 7 is a waveform chart for explaining the operation of the mode 5;

FIGS. 9A through 9D are waveform charts for explaining the operation of the embodiment shown in FIG. 8.

DETAILED DESCRIPTION OF PREFERRED EMBODIMENTS

Preferred embodiments of the present invention applied to a computer display for example will be explained in detail below with reference to the drawings. It should noted that the computer display is provided with each channel of R (red), G (green) and B (blue) as external connecting terminals and that there are five kinds of patterns for inputting a synchronizing pulse, as follows:

Mode 1: external horizontal synchronizing pulse and green video signal containing synchronizing signal;

Mode 2: external composite synchronizing pulse and green video signal containing synchronizing signal;

Mode 3: external horizontal synchronizing pulse;

Mode 4: external composite synchronizing pulse; and

Mode 5: green video signal containing synchronizing signal.

The green video signal containing the synchronizing signal above refers to a video signal input only to the G channel while containing the synchronizing signal.

Figure 1:
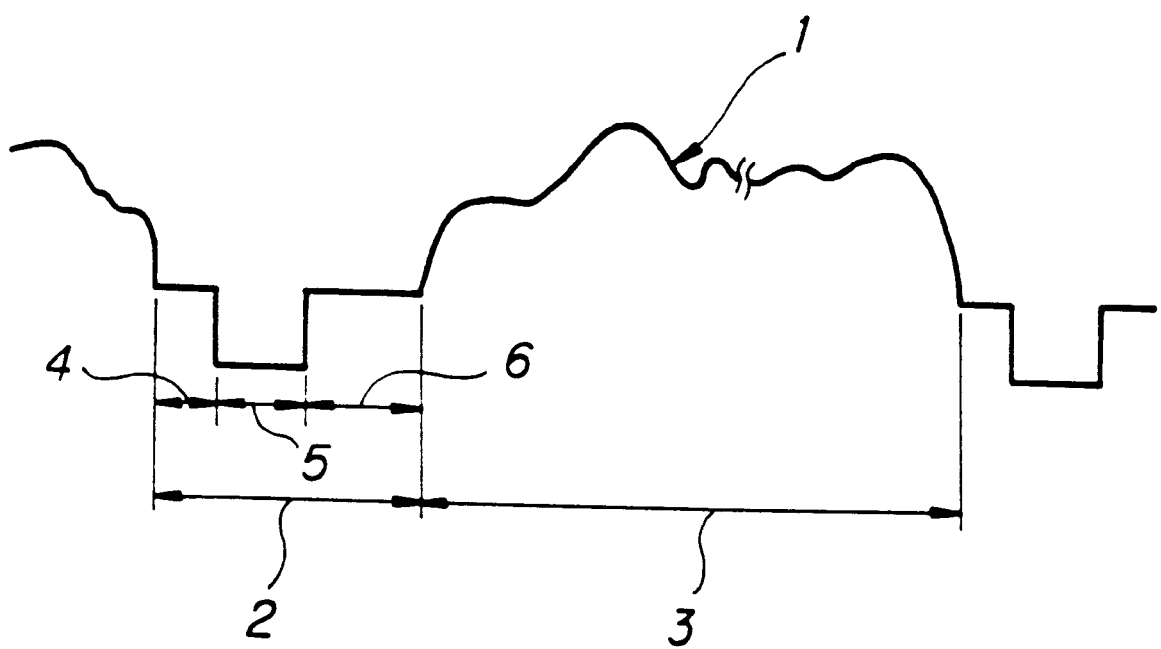
FIG. 1 is a waveform chart of a green video signal.
Figure 2:
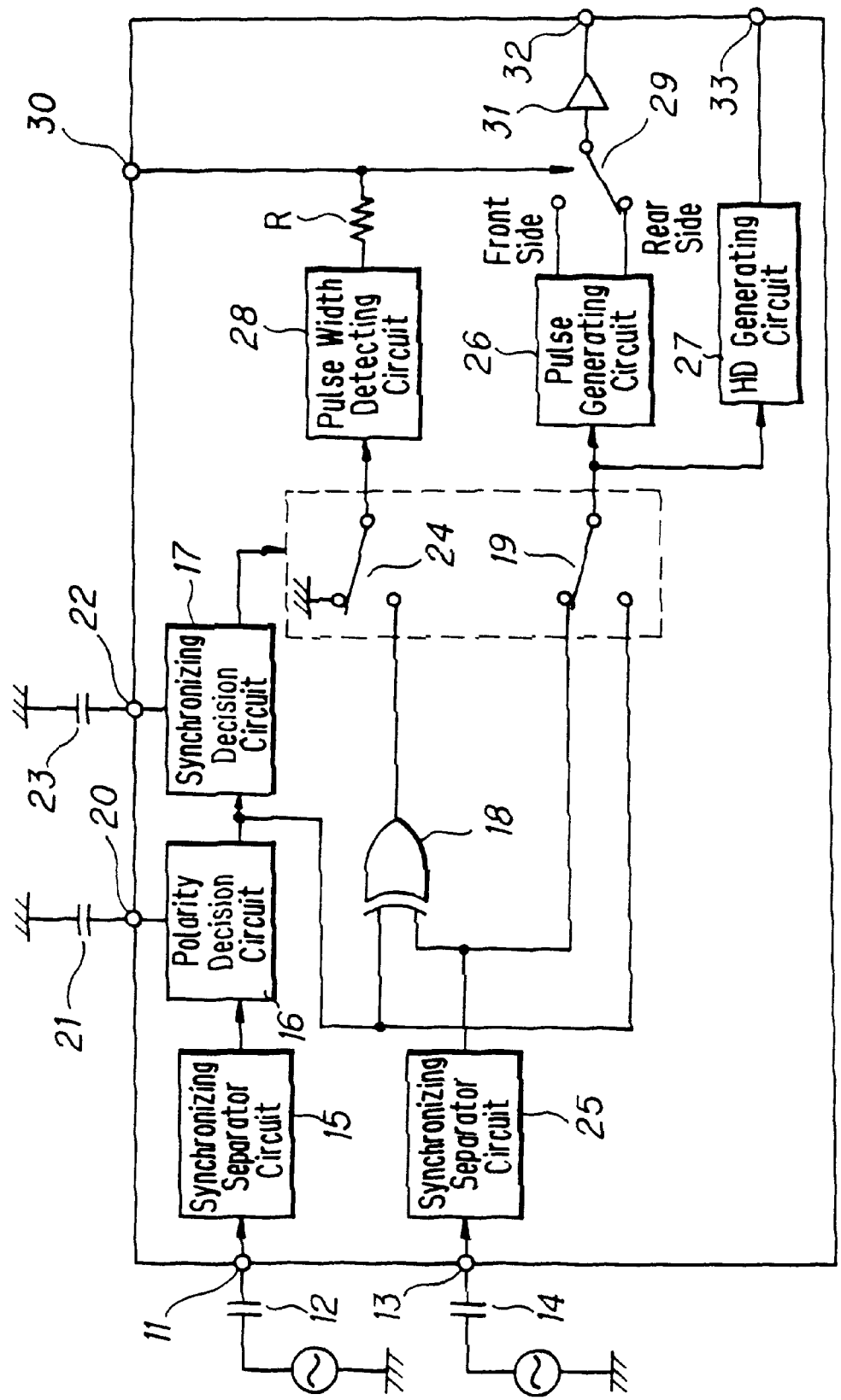
FIG. 2 is a block diagram illustrating a first embodiment of the present invention.

FIG. 2 is a block diagram illustrating a first embodiment of the clamp pulse generating circuit of the present invention. In the figure, an external horizontal synchronizing pulse H or an external composite synchronizing pulse CS containing a horizontal synchronizing pulse and a vertical synchronizing pulse is input as an external synchronizing pulse to a synchronizing input terminal 11 via an AC coupling capacitor 12. Further, a composite video signal containing a synchronizing pulse such as a horizontal synchronizing pulse and vertical synchronizing pulse is input to a video input terminal 13 via an AC coupling capacitor 14. As the composite video signal, the green video signal containing the synchronizing signal described above is input. The external horizontal synchronizing pulse H or the external composite synchronizing pulse CP input to the synchronizing input terminal 11 is supplied to a synchronizing separator circuit 15, which separates the synchronizing signal by having a predetermined slicing level. The horizontal synchronizing pulse separated by the synchronizing separator circuit 15 is supplied to a synchronizing decision circuit 17 via a polarity decision circuit 16 and is also input to one side of an exclusive-OR circuit 18 and a change-over switch 19.

A capacitor 21 is connected to the polarity decision circuit 16 via an external connecting terminal 20 between the ground. The polarity decision circuit 16 decides whether the polarity of the horizontal synchronizing pulse is positive or negative and outputs negative polarity pulses as positive polarity pulses. A capacitor 23 is connected to the synchronizing decision circuit 17 via an external connecting terminal 22 between the ground. The synchronizing decision circuit 17 decides whether an external synchronizing pulse is been input by composing a peak hold circuit by the capacitor 23 and outputs a decision result of "H" level when the external synchronizing pulse is been input and of "L" level when no external synchronizing pulse is been input. This decision output becomes a switching control signal of the change-over switches 19 and 24.

Meanwhile, the green video signal containing the synchronizing signal input to the video input terminal 13 is supplied to a synchronizing separator circuit 25. The synchronizing separator circuit 25 separates the synchronizing signal by having a predetermined slicing level. The horizontal synchronizing pulse separated by the synchronizing separator circuit 25 is input to each of the other side of the exclusive-OR circuit 18 and the change-over switch 19. An output of the exclusive-OR circuit 18 becomes an input of one side of the change-over switch 24. The change-over switch 24 receives the ground (GND) level as the other input. The change-over switches 19 and 24 are controlled by the decision output of the synchronizing decision circuit 17.

That is, when the synchronizing decision circuit 17 decides as "the external synchronizing pulse is being input", the change-over switch 19 selects the horizontal synchronizing pulse output from the synchronizing separator circuit 15 and the change-over switch 24 selects the output of the exclusive-OR circuit 18, respectively, and when the synchronizing decision circuit 17 decides as "no external synchronizing pulse is being input", the change-over switch 19 selects the horizontal synchronizing pulse output from the synchronizing separator circuit 25 and the change-over switch 24 selects the ground level, respectively. A selection output of the change-over switch 19 is supplied to a pulse generating circuit 26 and a HD generating circuit 27. A selection output of the change-over switch 24 is supplied to a pulse width detecting circuit 28.

When the horizontal synchronizing pulse is input, the pulse generating circuit 26 generates a clamp pulse having a predetermined pulse width at the front edge thereof and a clamp pulse having a predetermined pulse width at the rear edge. Its concrete circuit structure will be described later. Those two clamp pulses become two inputs of a change-over switch 29. The change-over switch 29 selects either of the clamp pulses in response to a detection output of the pulse width detecting circuit 28 supplied via a resistor R. Further, when a control signal is input from outside via a control input terminal 30, it forces to select the clamp pulse at the front edge of the horizontal synchronizing pulse when the control signal is at "H" level and the clamp pulse at the rear edge when it is at "L" level, irrespective of the detection output of the pulse width detecting circuit 28.

Because a difference between a horizontal blanking section and a horizontal synchronizing section is about 600 ns in case of a signal in which the difference is considered to be narrowest, the pulse width detecting circuit 28 is constructed so as to generate "H" level detection output when the pulse width of an input pulse is wider than a time which corresponds to that difference of the sections and to generate "L" level output when it is narrower. The clamp pulse selected by the change-over switch 29 is lead to the outside from a CPL output terminal 32 via a buffer 31. Meanwhile, the HD generating circuit 27 generates a HD pulse at the input horizontal synchronizing pulse. The HD pulse is lead to the outside from a HD output terminal 33.

In the circuit constructed as described above, the exclusive-OR circuit 18, the change-over switch 24 and the pulse width detecting circuit 28 compose video decision means for deciding whether the green video signal containing the synchronizing pulse is been input or not.

The operation of the circuit of the video decision means will be explained below on the basis of a waveform chart of each input pattern shown in FIG. 3. In case of the synchronizing input modes 3 and 4 described above, the green video signal having no synchronizing pulse and the external horizontal synchronizing pulse H or the external composite synchronizing pulse CS are input in the computer display.

Figure 3:
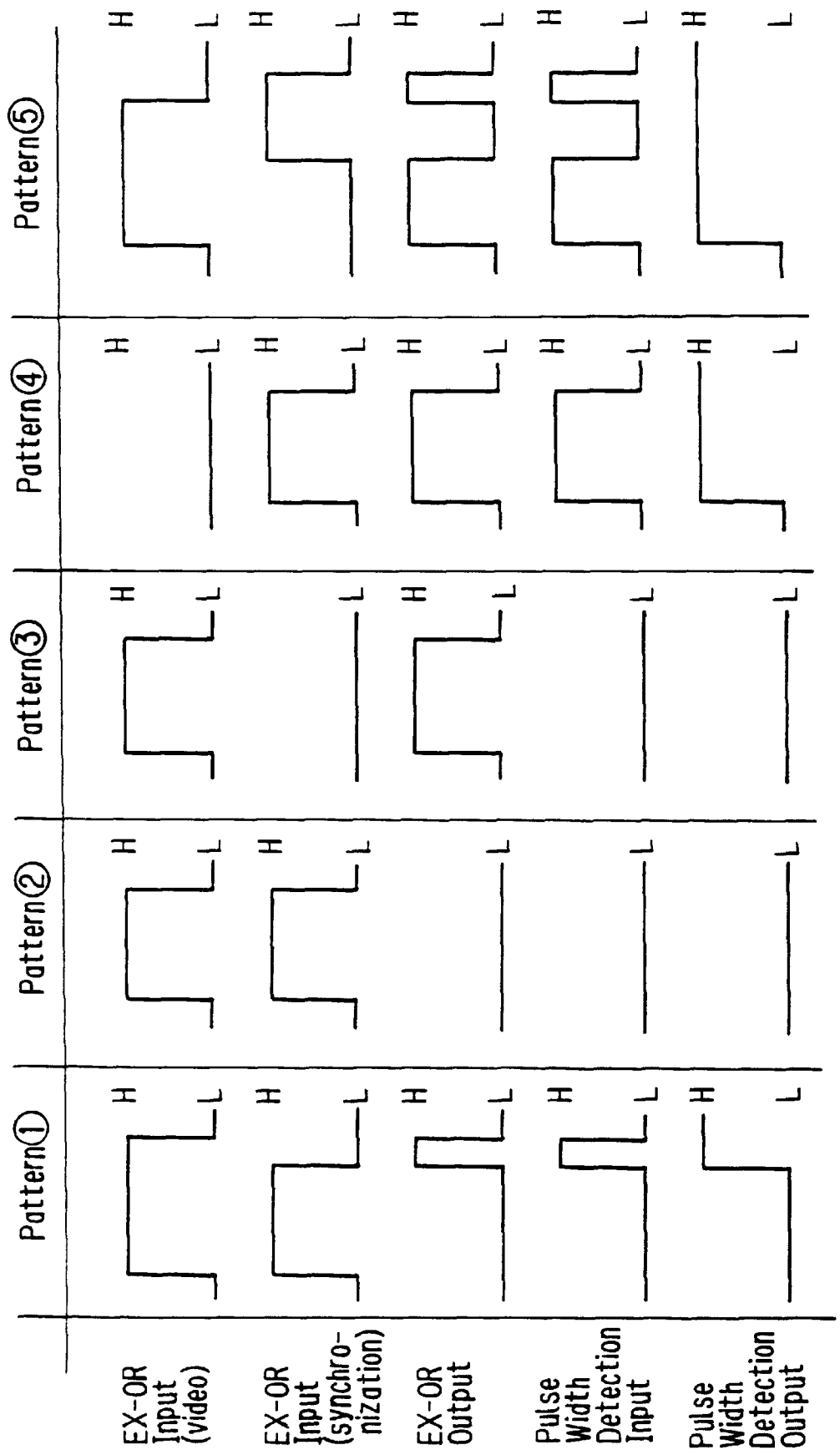
FIG. 3 is a waveform chart for explaining operations for deciding whether a video signal containing a synchronizing pulse is been input or not.

In this case, a signal in the horizontal blanking section of the video input and the horizontal synchronizing pulse become the two inputs of the exclusive-OR circuit 18 as shown in Pattern 1 in FIG. 3 and logic of those two inputs disagree in the section corresponding to the difference between the horizontal blanking section and the horizontal synchronizing section, so that a pulse signal having a pulse width which corresponds to the difference of these section is output from the exclusive-OR circuit 18 and is input to the pulse width detecting circuit 28 via the change-over switch 24. The pulse width of this input pulse is more than 600 ns from the reason described above. Accordingly, the pulse width detecting circuit 28 generates the "H" level detection output indicating that the green video signal input together with the external synchronizing pulse has no synchronizing pulse.

Next, in case of modes 1 and 2, both the green video signal containing the synchronizing pulse and the external horizontal synchronizing pulse H or external composite synchronizing pulse CS are input. In this case, the two inputs of the exclusive-OR circuit 18 are both horizontal synchronizing pulses as shown in Pattern 2 in FIG. 3 and logic of two inputs completely agree each other, so that a "L" level signal is output from the exclusive-OR circuit 18 and is input to the pulse width detecting circuit 28 via the change-over switch 24. The pulse width at this time is zero. Accordingly, the pulse width detecting circuit 28 generates the "L", level detection output indicating that the green video signal input together with the external synchronizing pulse has the synchronizing pulse.

In case of mode 5, because only the green video signal containing the synchronizing pulse is input, logic of two inputs of the exclusive-OR circuit 18 disagree in the horizontal synchronizing section as shown in Pattern 3 in FIG. 3 and the exclusive-OR circuit 18 outputs a "H" level signal. However, because no external synchronizing pulse is been input at this time, the change-over switch 24 selects the ground level from the result of the decision of the synchronizing decision circuit 17 and inputs it to the pulse width detecting circuit 28. Accordingly, the pulse width detecting circuit 28 generates the "L" level detection output indicating that the green video signal input to the video input terminal 13 has the synchronizing pulse.

As it is apparent from the above explanation of the operation, the video decision means comprising the exclusive-OR circuit 18, the change-over switch 24 and the pulse width detecting circuit 28 can decide that the green video signal containing the synchronizing pulse has been input to the video input terminal 13, when it has been in fact input, regardless whether the external horizontal synchronizing pulse H or the external composite synchronizing pulse CS has been input or not.

Figure 4A:
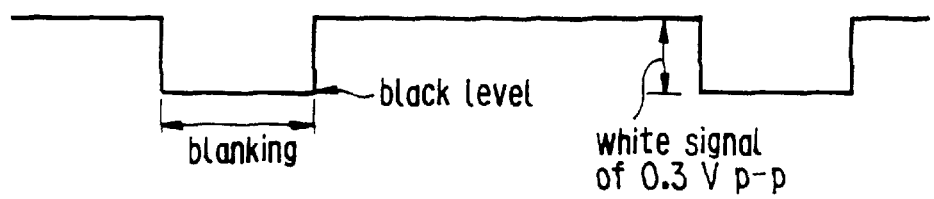
FIGS. 4A and 4B are waveform. charts of video signals in a special input pattern 4 in FIG. 3.
Figure 4B:
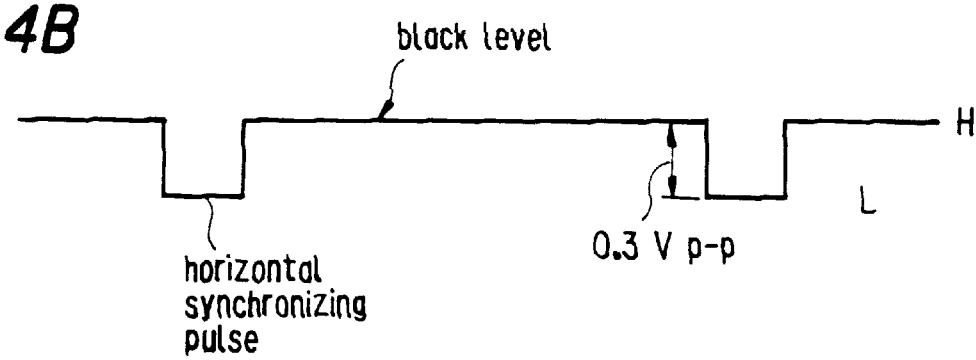

Incidentally, because a white video signal of about 0.3 V having no synchronizing pulse shown in FIG. 4A and a full black video signal having synchronizing pulses and having almost equal horizontal synchronizing sections and horizontal blanking sections shown in FIG. 4B resemble closely from each other, it is difficult to decide the both signals by way of analog signal processing and the former video signal shown in FIG. 4A may be erroneously decided as a video signal having synchronizing pulses even though it has no synchronizing signal.

However, noticing on the difference (about 600 ns) between the horizontal blanking section and the horizontal synchronizing section, the video decision means of the present embodiment constructed as described above decides whether the video signal containing synchronizing pulse has been input or not on the basis of the difference of the sections, so that it can decide the white video signal of about 0.3 V having no synchronizing pulse in FIG. 4A and the full black video signal having the synchronizing pulses and having almost equal horizontal synchronizing sections and horizontal blanking sections in FIG. 4B without fault and will not erroneously decide the former video signal in FIG. 4A as a video signal containing synchronizing pulses.

As a special pattern, there is a pattern (Pattern 4 in FIG. 3) in which a video signal whose horizontal blanking section is black level is input together with the external horizontal synchronizing pulse H or the external composite synchronizing pulse CS. In this case, because logic of two inputs of the exclusive-OR circuit 18 disagree each other, a signal having the same pulse width with the horizontal synchronizing pulse is output from the exclusive-OR circuit 18 and is input to the pulse width detecting circuit 28 via the change-over switch 24. Thereby, the pulse width detecting circuit 28 generates the "H" level detection output indicating that the video signal input together with the external synchronizing pulse have no synchronizing pulse.

Figure 5A:
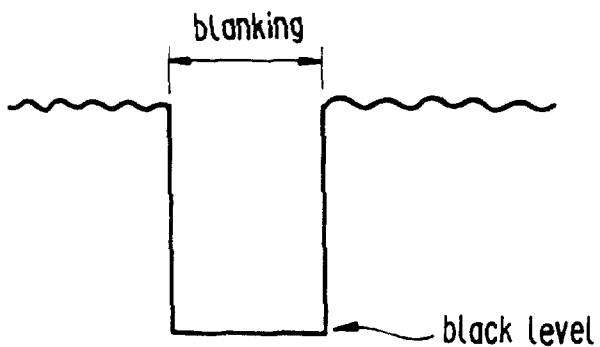
FIGS. 5A and 5B are waveform charts showing a timing relationship between a video signal and a horizontal synchronizing pulse in a special input pattern 5 in FIG. 3.
Figure 5B:
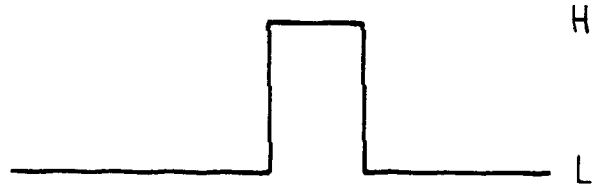

There is also another pattern (Pattern 5 in FIG. 3) in which the external horizontal synchronizing pulse H or the external composite synchronizing pulse CS shown in FIG. 5B is input in a timing overstepping the horizontal blanking period of the green video signal shown in FIG. 5A. In this case, because logic of two inputs of the exclusive-OR circuit 18 disagree partly, the "H" level signal is output from the exclusive-OR circuit 18 in the disagreed period and is input to the pulse width detecting circuit 28 via the change-over switch 24. Because the pulse width of the input pulse is more than 600 ns, the pulse width detecting circuit 28 generates the "H" level detection output indicating that the video signal input together with the external synchronizing pulse has no synchronizing pulse.

Next, the operation of the circuit constructed as described above will be explained with reference to waveform charts in FIGS. 6A through 6C. At first, the mode in which the external horizontal synchronizing pulse H or the external composite synchronizing pulse CS is input to the synchronizing input terminal 11 as the synchronizing input will be explained. This mode corresponds to the synchronizing input modes 3 and 4 d4scribed above in the computer display. In case of the modes 3 and 4, the synchronizing decision circuit 17 decides as "the external synchronizing pulse is being input" and the "H" level decision output is supplied to the change-over switches 19 and 24. Thereby, the change-over switch 19 selects the horizontal synchronizing pulse output from the synchronizing separator circuit 15 and supplies it to the pulse generating circuit 26.

Then, the pulse generating circuit 26 generates a clamp pulse having a pulse width t1 shown in FIG. 6B at the front edge (leading edge) of the inputted horizontal synchronizing pulse shown in FIG. 6A as well as a clamp pulse having a pulse width t2 shown in FIG. 6C at the rear edge (trailing edge) thereof. At this time, because the pattern of two inputs of the exclusive-OR circuit 18 is Pattern 1 in FIG. 3, the "H" level signal indicating that the green video signal input together with the external synchronizing pulse has no synchronizing pulse is output from the pulse width detecting circuit 28. Thereby, the change-over switch 29 selects the clamp pulse having the pulse width t1 at the front edge in FIG. 6B and outputs it to the outside via the buffer 31 and the CPL output terminal 32.

When the external synchronizing pulse is input like the case of the modes 3 and 4, there is an enough margin from the generating timing of the clamp pulse in FIG. 6B to the video section in clamping a pedestal level of a color video signal by the clamp pulse in FIG. 6B by generating it at the front edge of the horizontal synchronizing pulse shown in FIG. 6A, so that the pulse width t1 of the clamp pulse in FIG. 6B can be fully widely set. The pedestal level can be accurately held in clamping the pedestal by widely setting the pulse width t1 of the clamp pulse in FIG. 6B as described above.

Next, the case of the mode 5 in which the green video signal containing the synchronizing pulse is input to the video input terminal 13 as the synchronizing input will be explained. In case of the mode 5, because no external synchronizing pulse is input to the synchronizing input terminal 11, the synchronizing decision circuit 17 decides as "no external synchronizing pulse is being input" and a "L" level decision output is supplied to the change-over switches 19 and 24. Thereby, the change-over switch 19 selects the horizontal synchronizing pulse output from the synchronizing separator circuit 25 and supplies it to the pulse generating circuit 26. Then, the pulse generating circuit 26 generates clamp pulses shown in FIGS. 6B and 6C at the front and rear edges of the horizontal synchronizing pulse shown in FIG. 6A in the same manner with the cases of the modes 3 and 4.

Because the pattern of two inputs of the exclusive-OR circuit 18 is Pattern 3 in FIG. 3, the "L" level signal indicating that the green video signal input together with the external synchronizing pulse has the synchronizing pulse is output from the pulse width detecting circuit 28. Thereby, the change-over switch 29 selects the clamp pulse in FIG. 6C having a pulse width t2 at the rear edge and outputs it to the outside via the buffer 31 and the CLP output terminal 32. This clamp pulse in FIG. 6C is generated in the back porch portion of the video signal as shown in FIG. 7. If the pulse width t2 of the clamp pulse in FIG. 6C is set wide excessively as shown by the broken line (t21) in FIG. 7, it ends up holding even the level of the video signal portion in clamping the pedestal because the section of the back porch portion is narrow. Accordingly, the pulse width t2 of the clamp pulse in FIG. 6C is limited.

In contrast to the general modes of the modes 3, 4 and 5 described above, there are the modes 1 and 2 as special modes in which the external synchronizing pulse and the green video signal containing the synchronizing signal are both input. In case of the special modes 1 and 2, because the external horizontal synchronizing pulse H or the external composite synchronizing pulse CS is input to the synchronizing input terminal 11, the synchronizing decision circuit 17 decides as "the external synchronizing pulse is being input" and the "H" level decision output is supplied to the change-over switch 19 and 24. Thereby, the change-over switch 19 selects the horizontal synchronizing pulse output from the synchronizing separator circuit 15 and supplies it to the pulse generating circuit 26. This is the same with the case of the modes 3 and 4 and the pulse generating circuit 26 generates the clamp pulses shown in FIGS. 6B and 6C at the front and rear edges of the horizontal synchronizing pulse in FIG. 6A.

Consider now in the special modes 1 and 2 a case when the clamp pulse in FIG. 6B at the front edge of the horizontal synchronizing pulse in FIG. 6A is selected similarly to the case of the modes 3 and 4. In the special modes 1 and 2, the green video signal containing the synchronizing signal is input only to the G channel of the video signal in the computer display, the pedestal clamp is carried out in the horizontal synchronizing pulse section when the clamp pulse in FIG. 6B generated at the front edge of the horizontal synchronizing pulse in FIG. 6A is used. Then, a brightness of only the G channel among the R, G and B channels increases abnormally, thus producing greenish images.

However, because the pattern of two inputs of the exclusive-OR circuit 18 in this case is Pattern 2 in FIG. 3, the "L" level signal indicating that the green video signal input together with the external synchronizing pulse has the synchronizing pulse is output from the pulse width detecting circuit 28. Thereby, the change-over switch 29 selects the clamp pulse in FIG. 6C at the rear edge of the horizontal synchronizing pulse in FIG. 6A. That is, in the special modes 1 and 2, it is automatically decided that the green video signal containing the synchronizing pulse is being input and the clamp pulse in FIG. 6C at the rear edge of the horizontal synchronizing pulse in FIG. 6A is generated even if the external synchronizing pulse is being input. Thereby, no pedestal clamp is carried out in the section of the horizontal synchronizing pulse when the green video signal containing the synchronizing signal is input and the above-mentioned problem can be avoided from occurring.

Because the clamp pulse in FIG. 6B is generated at the front edge of the horizontal synchronizing pulse in FIG. 6A in the modes 3 and 4 in which only the external synchronizing pulse is input as the synchronizing input and there is an enough margin from the generating timing thereof to the video section as described above, the pulse width of the clamp pulse in FIG. 6B can be set at any desired value. Accordingly, because the pulse width of the clamp pulse in FIG. 6B can be fully widely set by adopting the modes 3 and 4 as the synchronizing input mode, it becomes possible to deal with the increase of resolution of the computer display or the like even if the horizontal frequency is increased with the increase of the resolution and the interval of the back porch portion becomes narrower.

Further, beside Patterns 1, 2 and 3, there are Patterns 4 and 5 as special patterns in FIG. 3 as described above. Because the "H" level signal indicating that the green video signal input together with the external synchronizing pulse has no synchronizing pulse is output from the pulse width detecting circuit 28 also in the case of these two input patterns, the clamp pulse at the front edge of the horizontal synchronizing pulse is generated. Here, in case of Pattern 4, the pedestal level can be ensured to be held even if the pedestal clamp is carried out in the horizontal blanking period by using the clamp pulse at the front edge of the horizontal synchronizing pulse because the horizontal blanking period of the video signal is black level (pedestal level) and there is an enough margin from the time of generating the clamp pulse to the video section similarly to the case of the modes 3 and 4, so that a desired pulse width can be set for the pulse width of the clamp pulse.

In case of Pattern 5, i.e. when the external horizontal synchronizing pulse H is input in the timing outstepping the horizontal blanking period of the green video signal as shown in FIG. 5, on the other hand, the pedestal clamp cannot be carried out by generating the clamp pulse at the rear edge of the horizontal synchronizing pulse like the related art because the generating timing overlaps with the video section. However, the pedestal clamp can be surely carried out by the present invention by generating the clamp pulse at the front edge of the horizontal synchronizing pulse as described above because the generating timing lies within the horizontal blanking section.

It should be noted that although the case in which the clamp pulse at the front edge of the horizontal synchronizing pulse or the clamp pulse at the rear edge thereof is generated by automatically switching the change-over switch 29 at the detection output of the pulse width detecting circuit 28 have been described in the above explanation of the operation, it is also possible to generate the clamp pulse at the front edge of the horizontal synchronizing pulse or the clamp pulse at the rear edge thereof selectively and forcibly, irrespective of the state of the detection output of the pulse width detecting circuit 28, by supplying a switching control signal of the change-over switch 29 from the outside via the control input terminal 30. That is, it is possible to generate the clamp pulse at the front edge of the horizontal synchronizing pulse forcibly by supplying a "H" level control signal from the outside and to generate the clamp pulse at the rear edge of the horizontal synchronizing pulse by supplying a "L" level control signal.

Figure 8:
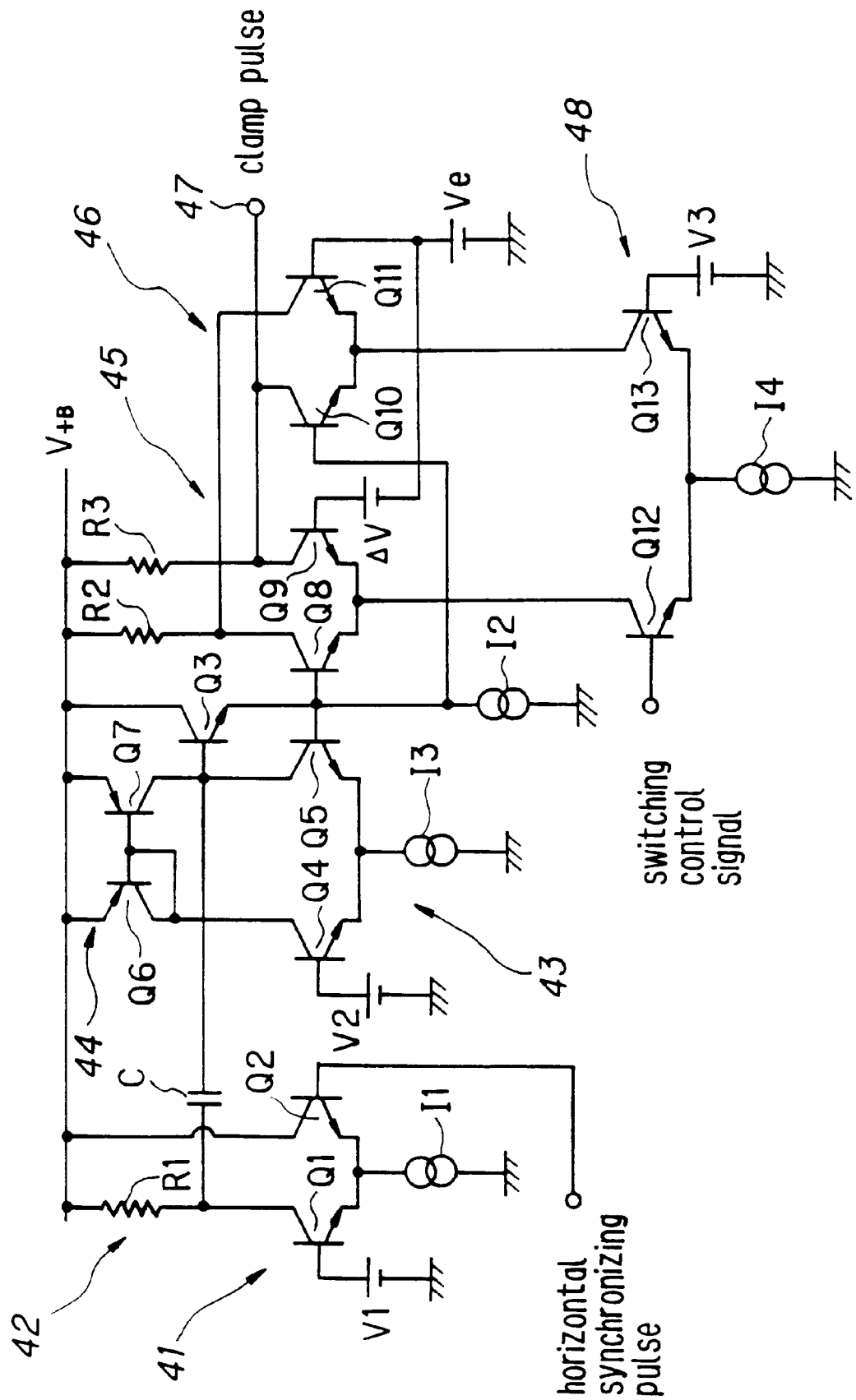
FIG. 8 is a circuit diagram illustrating a concrete circuit structural example of a pulse generating circuit according to a second embodiment of the present invention.

FIG. 8 is a circuit diagram illustrating one example of a concrete circuit structure of the pulse generating circuit 26 in FIG. 2 according to a second embodiment of the present invention. In the figure, a comparator 41 is composed of transistors Q1 and Q2 whose emitters are connected in common and a current source I1 connected between the common emitters connecting point and the ground. In the comparator 41, a collector of the transistor Q1 is connected to a power supply $V_{+B}$ via a resistor R1 and a collector of the transistor Q2 is connected directly to the power supply, respectively. A horizontal synchronizing pulse applied to a base of the transistor Q2 is compared with a reference voltage V1 applied to a base of the transistor Q1. The collector of the transistor Q1 is connected also to a base of a transistor Q3 of an emitter follower via a capacitor C. A differentiating circuit 42 is composed of the resistor R1 and the capacitor C. An emitter of the transistor Q3 is grounded via a current source 12.

A differential amplifier 43 is composed of transistors Q4 and Q5 whose emitters are connected in common and a current source I3 connected between the common emitters connecting point and the ground. In the differential amplifier 43, a reference voltage V2 is applied to a base of the transistor Q4 and an emitter output of the transistor Q3 is supplied to a base of the transistor Q5. A diode connection transistor Q6 is connected between a collector of the transistor Q4 and the power supply and a transistor Q7 whose base is connected in common with the transistor Q6 is connected between a collector of the transistor Q5 and the power supply. A current mirror circuit 44 is composed of those transistors Q6 and Q7.

Two comparators 45 and 46 are composed of transistors Q8 and Q9 and transistors Q10 and Q11, respectively. The emitters of the two transistors in each of the comparators 45 and 46 are connected in common. The collectors of the transistors Q8 and Q11 are connected to the power supply via a common resistor R2 and the collectors of the transistors Q9 and Q10 are connected to the power supply via a common resistor R3 as well as commonly to a circuit output terminal 47. In one comparator 45, an emitter output of the transistor Q3 is supplied to a base of the transistor Q8 and a reference voltage Ve+ΔV is applied to a base of the transistor Q9. In the other comparator 46, the emitter output of the transistor Q3 is supplied to a base of the transistor Q10 and a reference voltage Ve is applied to a base of the transistor Q11.

A collector of a transistor Q12 is connected to the common connecting point of the emitters of the transistors Q8 and Q9 and a collector of a transistor Q13 is connected to the common connecting point of the emitters of the transistors Q10 and Q11, respectively. Emitters of the transistors Q12 and Q13 are connected in common and are grounded via a current source 14. Then, a switching circuit 48 is composed which activates the comparator 45 when a signal level of a switching control signal applied to a base of the transistor Q12 is greater than a reference voltage V3 applied to a base of the transistor Q13 and activates the comparator 46 when that is smaller. This switching circuit 48 corresponds to the change-over switch 29 in FIG. 2. Accordingly, the control signal input via the synchronizing decision circuit 17 or the control input terminal 30 in FIG. 2 is the switching control signal applied to the base of the transistor Q12.

Next, the circuit operation of the pulse generating circuit 26 constructed as described above will be explained with reference to waveform charts shown in FIGS. 9A through 9D. When a horizontal synchronizing pulse shown in FIG. 9A is applied to the base of the transistor Q2 in the comparator 41 in the input stage, a differential waveform shown in FIG. 9B is obtained at the emitter of the transistor Q3 by the operation of the differentiating circuit 42. This differential waveform shown in FIG. 9B is a waveform whose reference level is the reference voltage V2 applied to the base of the transistor Q4. This waveform is compared with the reference voltages Ve+ΔV and Ve in the comparators 45 and 46.

Here, in case of the modes 3 and 4 in which only the external synchronizing pulse is input as the synchronizing input, the "H" level detection output is applied from the pulse width detecting circuit 28 in FIG. 2 to the base of the transistor Q12 of the switching circuit 48 as the switching control signal. Thereby, the comparator 45 is activated because the transistor Q12 is turned ON. Because the differential waveform in FIG. 9B is compared with the reference voltage Ve+ΔV in the comparator 45, a clamp pulse shown in FIG. 9C is derived as a collector output of the transistor Q9 at the front edge of the horizontal synchronizing pulse in FIG. 9A.

In case of the mode 5 in which only the green video signal containing the synchronizing signal is input as the synchronizing input on the other hand, the "L" level decision output is applied from the pulse width detecting circuit 28 in FIG. 2 to the base of the transistor Q12 of the switching circuit 48 as the switching control signal. Thereby, the comparator 46 is activated because the transistor Q13 is turned ON. Because the differential waveform in FIG. 9B is compared with the reference voltage Ve in the comparator 46, a clamp pulse shown in FIG. 9D is derived as a collector output of the transistor Q10 at the rear edge of the horizontal synchronizing pulse in FIG. 9A.

Further, in case of the special modes 1 and 2, because the "L" level detection output is applied from the pulse width detecting circuit 28 in FIG. 2 to the base of the transistor Q12 as the switching control signal, the clamp pulse shown in FIG. 9D is generated at the rear edge of the horizontal synchronizing pulse in FIG. 9A similarly to the case of the mode 5.

It should be noted that the circuit structure of the pulse generating circuit 26 described above is mere one example and is not limited to that. That is, although the circuit structure shown in the above-mentioned example has a pulse width of the clamp pulse in FIG. 9C generated at the front edge of the horizontal synchronizing pulse in FIG. 9A and that of the clamp pulse in FIG. 9D generated at the rear edge being set equal, it is also possible to structure a circuit in which the pulse width of the clamp pulse in FIG. 9C generated at the front edge is set fully long by the reason described before. It can be realized by a circuit structure in which a time constant of the differentiating circuit 42 in FIG. 8 is switched or a circuit structure in which the voltage AV of the reference voltage Ve+ΔV is changed.

As described above, according to the present invention, the clamp pulse generating circuit is equipped with the function for deciding whether the video signal containing a synchronizing pulse is being input or not in addition to the function for deciding whether an external synchronizing pulse is being input or not and is constructed so as to generate the clamp pulse at the front edge of the external synchronizing pulse when the external synchronizing pulse is being input and to generate the clamp pulse at the rear edge of the synchronizing pulse when the video signal containing the synchronizing pulse is being input irrespective of whether the external synchronizing pulse is being input or not, so that in the mode when only the external synchronizing pulse is input as the synchronizing input, a desirable pulse width can be set as the pulse width of the clamp pulse because there is an enough margin from the clamp pulse generating timing to the video signal section and it can deal with the special mode in which the both external synchronizing pulse and the green video signal containing the synchronizing signal are input as the synchronizing input automatically.

While preferred embodiments have been described, variations thereto will occur to those skilled in the art within the scope of the present inventive concepts which are delineated by the following claims.

What is claimed is:

1. A pulse generating circuit, comprising:
a first differential circuit comprising first and second transistors,
said second transistor being supplied with a synchronizing pulse signal and said first transistor outputting an output signal being taken out from a collector thereof;
a fifth transistor and a second differential circuit comprising third and fourth transistors, said fifth transistor having a base and an emitter respectively connected to said collector of said first transistor in said first differential circuit and a base of said fourth transistor in said second differential circuit;
a coupling element connected between said collector of said first transistor and the base of said fifth transistor;
a third differential circuit comprising a sixth transistor having a base connected to the base of said fourth transistor in said second differential circuit and a collector connected to a first reference potential via a first resistor, and a seventh transistor having an emitter connected in common to an emitter of said sixth transistor and a collector connected to said first reference potential via a second resistor;
a fourth differential circuit comprising an eighth transistor having a base connected to a base of said sixth transistor and a collector connected to said collector of said seventh transistor, and a ninth transistor having a base connected to a second reference potential and a collector connected to said collector of said sixth transistor;
a third reference potential connected between said second reference potential and the base of said seventh transistor;
a fifth differential circuit comprising tenth and eleventh transistors whose collectors are respectively connected to common emitters of said third and fourth differential circuits, one of said tenth and eleventh transistors being supplied with a switching control signal given to a base thereof; and
an output terminal for taking out an output clamp pulse from the collector of said eighth transistor.

2. The pulse generating circuit according to claim 1, further comprising a third resistor connected to the collector of said first transistor in said first differential circuit, wherein said coupling element and said third resistor form a differentiating circuit.

3. The pulse generating circuit according to claim 1, wherein said coupling element is a capacitor.

4. The pulse generating circuit according to claim 1, wherein said third reference potential is varied to change a width of the output clamp pulse.

5. The pulse generating circuit according to claim 2, wherein a value of the third resistor and a value of the coupling element in said differentiating circuit are arbitrarily selected to change a time constant of said differentiating circuit and to make the output clamp pulse have an arbitrary pulse width.

6. The pulse generating circuit according to claim 1, wherein the output clamp pulse is generated by supplying the synchronizing pulse signal to the base in said second transistor in said first differential circuit.

7. The pulse generating circuit according to claim 1, wherein the output clamp pulse generated at a front edge and at a rear edge of said synchronizing pulse signal is derived by switching the operation of said third and fourth differential circuits with said switching control signal supplied to the base in said tenth transistor in said fifth differential circuit.

* * * * *